(12) United States Patent
Vion

(10) Patent No.: US 9,416,263 B2
(45) Date of Patent: *Aug. 16, 2016

(54) PROPYLENE-ETHYLENE RANDOM COPOLYMER

(71) Applicant: INEOS EUROPE AG, Rolle (CH)

(72) Inventor: Jean-Marc Roland Ghislain Vion, Limelette (BE)

(73) Assignee: INEOS EUROPE AG, Rolle (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/428,815

(22) PCT Filed: Sep. 17, 2013

(86) PCT No.: PCT/EP2013/069304
§ 371 (c)(1),
(2) Date: Mar. 17, 2015

(87) PCT Pub. No.: WO2014/044687
PCT Pub. Date: Mar. 27, 2014

(65) Prior Publication Data
US 2015/0240063 A1 Aug. 27, 2015

(30) Foreign Application Priority Data
Sep. 19, 2012 (EP) ..................... 12185072

(51) Int. Cl.
*C08L 23/14* (2006.01)
*C08F 2/00* (2006.01)
*C08F 210/16* (2006.01)

(52) U.S. Cl.
CPC ............. *C08L 23/142* (2013.01); *C08F 2/001* (2013.01); *C08F 210/16* (2013.01); *C08L 2205/025* (2013.01); *C08L 2308/00* (2013.01)

(58) Field of Classification Search
CPC ...... C08F 210/16; C08F 2/001; C08F 210/06; C08F 2500/12; C08F 2500/17; C08F 2500/26; C08L 2666/06; C08L 23/142; C08L 2308/00; C08L 2205/025; C08L 2314/02
See application file for complete search history.

(56) References Cited

U.S. PATENT DOCUMENTS

2014/0005337 A1* 1/2014 Hallot et al. .................. 525/240

FOREIGN PATENT DOCUMENTS

| WO | WO 2006/082144 A1 | 8/2006 |
| WO | WO 2010/100098 A1 | 9/2010 |
| WO | WO 2012/126759 A1 | 9/2012 |

OTHER PUBLICATIONS http://www.xcentricmold.com/about-injection-molding.php. Taken from the WWW on Nov. 29, 2015, as evidence.*

* cited by examiner

*Primary Examiner* — Nathan M Nutter
(74) *Attorney, Agent, or Firm* — Nixon & Vanderhye P.C.

(57) ABSTRACT

Propylene random copolymer composition containing (A) 60-85 wt % of a copolymer of propylene and from 0.1 to 2 wt % of units derived from ethylene and having a melt flow rate value according to ISO 1130 (230° C., 2.16 kg) of from 80 to 200 g/10 min; and (B) 15-40 wt % of a copolymer of propylene and from 7 to 17 wt % of units derived from ethylene. The composition has a total ethylene content of from 3 to 4.5 wt %, and a melt flow rate value according to ISO 1133 (230° C., 2.16 kg) of greater than 60 to 150 g/10 min, the composition having not been subject to any form of post-reactor treatment which increases its melt flow rate by more than 5 g/10 min.

25 Claims, No Drawings

PROPYLENE-ETHYLENE RANDOM COPOLYMER

This application is the U.S. national phase of International Application No. PCT/EP2013/069304 filed Sep. 17, 2013 which designated the U.S. and claims priority to European Patent Application No. 12185072.1 filed Sep. 19, 2012, the entire contents of each of which are hereby incorporated by reference.

The present invention relates to thermoplastic polyolefin compositions and to articles obtained therefrom. In particular, the compositions described herein below are suitable for the production of moulded articles having good rigidity and good impact properties, and also having good transparency.

Propylene homopolymers have high resistance to heat and chemicals as well as beneficial mechanical properties. However, other properties of propylene homopolymers such as impact strength, particularly at low temperature, flexibility/rigidity, clarity or haze need to be improved for specific applications.

It is known that mechanical properties such as impact strength or optical properties can be improved by copolymerising propylene with ethylene or other alpha-olefins. If these comonomers are randomly distributed within the polymeric chain, a propylene random copolymer is obtained. Propylene random copolymers can be used in blow moulding, injection moulding and film extrusion applications for the preparation of materials such as food packaging, medical packaging and consumer products. For specific applications, large amounts of comonomer may need to be incorporated into the polypropylene, e.g. to provide a material having greater impact strength, and also a higher flexibility and softness: comonomer incorporation is known to reduce rigidity. Furthermore, optical properties as well as sealability are improved in polypropylenes having a higher comonomer content.

It is known from the prior art that good organoleptic properties are highly desirable for articles to be used in contact with food, and that this is achieved by minimising the generation and release of low molecular weight organic compounds. WO 03/046021 describes thermoplastic polyolefin compositions suitable for producing injection-moulded articles having a low level of hexane-extractable moieties; said compositions including in their broadest aspect a propylene polymer having a melt flow rate MFR of 3-30 g/10 min, which comprises 50-90 wt % of a propylene copolymer containing 1-7 wt % of units derived from ethylene and 10-50 wt % of a propylene copolymer containing 8-40 wt % of units derived from ethylene. The MFR of the final propylene polymer is obtained by subjecting to peroxidic degradation a precursor composition having a lower MFR value. However it is known that the process of peroxidic degradation or "cracking" results in compounds having poorer organoleptic properties, as well as poorer stiffness.

EP1873173A discloses a random polypropylene copolymer having an MFR of 70-150 g/10 min, which typically contains 1-7 wt % of ethylene comonomer and which may be bimodal. It is stated that the copolymer can be obtained by visbreaking (ie degrading or cracking) a propylene copolymer at a visbreaking ratio of 6.5-15. No other method of obtaining such high MFRs is disclosed.

As previously stated, although degradation (visbreaking or cracking) is a well known way of increasing the MFR of a polypropylene copolymer, it has certain disadvantages in that it results in poorer organoleptic properties, as well as poorer stiffness. In addition it obviously involves an additional process step, and sometimes two additional process steps if a subsequent detainting procedure is required to improve the organoleptic properties.

Our own application PCT/EP2012/054259 discloses random copolymers comprising 60-85 wt % of a copolymer of propylene and from 0.1 to 2 wt % of units derived from ethylene; and 15-40 wt % of a copolymer of propylene and from 7 to 17 wt % of units derived from ethylene, the composition having a total ethylene content of from 3 to 4.5 wt %, MFR of 10 to 120 g/10 min. It is stated in this application that when the MFR is from 50 to 120 g/10 min, it is preferred that the MFR of the final propylene polymer is obtained by subjecting the polymer to degradation, whereas in the case where the MFR is from 10 to 60 g/10 min, it is preferred that the composition has not been subjected to any form of degradation in order to increase the MFR value.

WO 2006/082144 discloses a propylene polymer having an MFR of 20-40 g/10 min which has not been obtained by degradation, and comprising in its broadest aspect 75-95 wt % of a propylene copolymer containing 0.5-3 mol % of units derived from ethylene and 5-25 wt % of a propylene copolymer containing 25-45 mol % of units derived from ethylene.

WO 2010100098 discloses random propylene copolymers with a low level of odour and taste which contain 2.5-5 wt % of ethylene comonomer and have an MFR of 25-100 g/10 min. They are made by a process which does not involve degradation. However only monomodal compositions are disclosed. Bimodal or multimodal compositions, which contain two or more propylene-ethylene copolymers, can have a better balance of mechanical properties as well as better organoleptic properties. Additionally, they have reduced powder stickiness at high MFR and total ethylene content.

We have now found that multimodal propylene copolymer compositions having a high MFR can be obtained without the need for any degradation step. Accordingly in a first aspect the present invention provides a random copolymer composition comprising (A) 60-85 wt % of a copolymer of propylene and from 0.1 to 2 wt % of units derived from ethylene and having a melt flow rate value according to ISO 1133 (230° C., 2.16 kg) of from 60 to 200 g/10 min; and (B) 15-40 wt % of a copolymer of propylene and from 7 to 17 wt % of units derived from ethylene, said composition having a total ethylene content of from 3 to 4.5 wt %, and a melt flow rate value according to ISO 1133 (230° C., 2.16 kg) of from 60 to 150 g/10 min, preferably of more than 60 but no greater than 150 g/10 min, the composition not having been subjected to any form of post-reactor treatment which increases its melt flow rate by more than 5 g/10 min, and preferably not having been subjected to any form of post-reactor treatment which increases its melt flow rate by more than 10 g/10 min.

Because the compositions of the invention have not been subjected to any form of degradation to increase the MFR, they may be in the form of a powder.

Preferably the compositions of the invention have not been subjected to any form of post-reactor treatment with either peroxide or oxygen.

The compositions of the invention have an excellent balance of impact resistance and rigidity, as well as good thermal resistance and crystallisation speed, particularly compared with similar compositions which contain more ethylene in fraction (A) and which have a lower MFR. The greater difference in ethylene content between the two blocks compared with compositions such as those disclosed in EP 2042552A increases the stiffness of the composition, leading to greater phase separation of the blocks but also faster crystallisation, thereby ensuring that stiffness is increasingly controlled by the matrix (A), which has a relatively low ethylene content compared to (B).

The relatively high MFR also results in good processability, which is particularly important for injection moulding. The balance of ethylene content in the two fractions also results in relatively good optical properties, whilst the balance of MFRs between the two fractions—relatively high in the more crystalline fraction (A) and relatively low in the more rubbery fraction (B)—can lead to lower levels of hexane extractables.

The melt flow rate value according to ISO 1133 is from 60 to 150 g/10 min, preferably more than 60 but no greater than 150 g/10 min, and preferably from 70 to 130 g/10 min. The most preferred MFR is from 80 to 120 g/10 min.

The molecular weight distribution, Mw/Mn as measured by gel permeation chromatography, of fraction (A) is preferably 3.5 or more and more preferably 4 or more. This can improve stiffness and processing in injection moulding. Apparent molecular weight distribution and associated averages, uncorrected for long chain branching, were determined by Gel Permeation (or Size Exclusion) Chromatography according to ISO16014-1, ISO 16014-2 and 16014-4, using a PL 220 of Polymer Laboratories with 4 columns WATERS STYRAGEL HMW 6E of 30 cm length and 1 guard column Waters Styragel 4.6×30 mm and a differential refractometer detector. The solvent used was 1,2,4 trichlorobenzene at 150° C., stabilised with BHT, of 0.2 g/liter concentration. Polymer solutions of 0.8 g/liter concentration were prepared at 150° C. for two hours without stirring. The nominal injection volume was set at 400 µl and the nominal flow rate was 1 ml/min. A relative calibration is constructed using 13 narrow molecular weight linear polystyrene standards:

| PS Standard | Molecular Weight |
| --- | --- |
| 1 | 7 520 000 |
| 2 | 4 290 000 |
| 3 | 2 630 000 |
| 4 | 1 270 000 |
| 5 | 706 000 |
| 6 | 355 000 |
| 7 | 190 000 |
| 8 | 114 000 |
| 9 | 43 700 |
| 10 | 18 600 |
| 11 | 10 900 |
| 12 | 6 520 |
| 13 | 2 950 |

The elution volume, V, is recorded for each PS standard. The PS molecular weight is then converted to PP equivalent using the following Mark Houwink parameters:
$K_{PS}=1.75 \cdot 10^{-4}$ dl g$^{-1}$; $\alpha_{PS}=0.67$; $k_{PP}=1.56 \cdot 10^{-4}$ dl g$^{-1}$; $\alpha_{PP}=0.76$.
The calibration curve Mw Pp=f(V) is then fitted with a first order linear equation: all the calculations are done with Empower 2 software from Waters.

Fraction (A) is preferably present in the composition in an amount of 65-83 wt %, and more preferably from 68-82 wt %.

The melt flow rate of fraction (A) is preferably from 70 to 150 g/10 min, more preferably from 80 to 130 g/10 min.

The ratio of melt flow rate of (A) to the melt flow rate of the composition is between 1.0 and 2.0, preferably between 1.0 and 1.7, more preferably between 1.1 and 1.5.

Fraction (B) is preferably present in the composition in an amount of 17-35 wt %, and more preferably from 18-32 wt %.

The content of units derived from ethylene in fraction (A) is preferably 0.3-1.7 wt %, and more preferably 1.0-1.7 wt %.

The content of units derived from ethylene in fraction (B) is preferably 9-16 wt %, and more preferably 9-13 wt %.

The ratio of units derived from ethylene in fraction (B) (in wt %) to the units derived from ethylene in fraction (A) (in wt %) is between 2 and 9, preferably between 4 and 9 and more preferably between 5 and 8.

The ethylene content of both fraction (A) and the overall composition is measured by FTIR. The proportion of fraction (B) in the final composition is determined by comparing the level of catalyst residues in fraction (A) with that in the final composition (ie fraction (A)+fraction (B)), on the assumption that fraction (B) is free of catalyst residues, since no additional catalyst has been added during the production of fraction (B). Similarly the ethylene content in fraction (B) is calculated based on the proportion of fraction (B), the ethylene content of fraction (A) and the ethylene content of the final composition.

Fraction (A) preferably has an intrinsic viscosity η(A) of 0.6-1.3 dg/l, preferably 0.7-1.2 dg/l and more preferably 0.7-1.0 dg/l.

Intrinsic viscosity was measured according to the principles of ISO1628-1, in tetralin at 135° C.

The composition of the invention preferably has an intrinsic viscosity η of 0.6-1.0 dg/l, more preferably 0.7-1.0 dg/l and most preferably 0.7-0.9 dg/l.

The intrinsic viscosity ratio of fractions (A) and (B), η(A)/η(B), prior to any degradation treatment, is preferably 0.6-1.25, more preferably 0.65-1.1 and most preferably 0.7-0.9. The intrinsic viscosity of fraction (B) is calculated from the measured intrinsic viscosities of fraction (A) and the whole composition, and the measured weight fraction of (B), w(B), according to the following formula:

$$[\eta(B)w(B)]/100=\eta(comp)-[1-w(B)/100]\eta(A)$$

The compositions of the present invention preferably have an impact strength (notched Izod according to ISO 180/1 A or notched Charpy according to ISO179/1eA) of at least 4.5 kJ/m$^2$ at 23° C. or at least 2.5 kJ/m$^2$ at 0° C.

The compositions of the present invention preferably have a flexural modulus (measured according to ISO 178) of at least 1100 MPa.

The compositions of the present invention preferably have haze values measured on a 2 mm injection-moulded plaque below 45%. Haze values are measured using a "Haze-Guard plus" haze meter from BYK Garder referred to in ASTM-D 1003.

The crystallisation temperature (Tc) of the compositions of the invention, as measured by Differential Scanning Calorimetry (DSC) with a cooling rate of 10° C./min, is preferably above 121° C., more preferably above 123° C. and most preferably above 125° C. This can represent a significant advantage in processing the material by injection moulding, where a shorter cooling time can enable a shorter cycle time in the process.

In the composition of the present invention, the moiety of hexane extractables is preferably lower than 5.5 wt %, in particular lower than 4.5 wt %. The hexane extractable fraction is determined according to FDA method 177, section 1520, Annex B) on polymer formed into 100 µm thick films.

The propylene polymers and propylene polymer compositions used for the articles of the present invention can also contain additives commonly employed in the art, such as antioxidants, light stabilisers, heat stabilisers, nucleating agents, clarifying agents, colourants and fillers. In particular, the addition of nucleating agents brings about a considerable improvement in important physical-mechanical properties, such as flexural modulus, heat distortion temperature (HDT), tensile strength at yield and transparency.

Examples of nucleating agents are p-tert.-butyl benzoate and 1,3- and 2,4-dibenzylidenesorbitols, and 1,2,3-trideoxy-4,6:5,7-bis-O-[(4-propylphenyl) methylene]-nonitol.

The nucleating agents are preferably added in quantities ranging from 0.05 to 2% by weight, more preferably from 0.1 to 1% by weight, and most preferably from 0.15% to 0.5% by weight, with respect to the total weight.

The clarifying agent is preferably present in the composition in an amount of from 0.01 to 0.6 wt %, preferably 0.1 to 0.5 wt % and more preferably 0.2 to 0.4 wt %. An example of a clarifying agent is Millad NX-8000.

The addition of inorganic fillers, such as talc, calcium carbonate and mineral fibers, also brings about an improvement to some mechanical properties, such as flexural modulus and HDT. Talc can also have a nucleating effect.

The propylene random copolymers of the invention can be prepared under process conditions known to the skilled person for the preparation of random copolymers. It is preferred that the propylene random copolymer is produced in a process comprising the following steps:
(i) preparing in a first stage a first propylene random copolymer, and
(ii) transferring the propylene random copolymer to a second stage where (co)polymerisation is continued to prepare a further propylene random copolymer. With the above defined process, a propylene random copolymer/propylene random copolymer mixture can be produced.

Accordingly another aspect of the invention provides a process for producing a propylene random copolymer, comprising the steps of:
(i) performing a copolymerisation or propylene and ethylene in a first stage to produce a first propylene random copolymer, and
(ii) transferring the first random copolymer to a second stage, optionally in a different reactor from the first stage, where copolymerisation is continued to prepare a second propylene random copolymer,
wherein the final polymer exiting the second stage has an MFR of 60-150 g/10 min prior to any subsequent processing.

It is preferred that the second random copolymer is made in a separate reactor from the first copolymer. Alternatively it is possible to make the second random copolymer in another part of the same reactor as that used to make the first copolymer. This generally requires a sufficiently high concentration of comonomer and hydrogen to be obtained in that part of the reactor.

The propylene random copolymers of the invention are advantageously produced in the gas phase. Gas-phase or vapour-phase olefin polymerisation processes are disclosed generally in "Polypropylene Handbook" pp. 293-298, Hanser Publications, NY (1996), and more fully described in "Simplified Gas-Phase Polypropylene Process Technology" presented in Petrochemical Review, March, 1993.

A gas-phase reactor system may function as a plug-flow reactor in which a product is not subject to backmixing as it passes through the reactor, such that conditions at one part of the reactor may be different from conditions at another part of the reactor. An example of a substantially plug-flow system is a horizontal, stirred, subfluized bed system such as described in U.S. Pat. No. 3,957,448; U.S. Pat. No. 3,965,083; U.S. Pat. No. 3,971,768; U.S. Pat. No. 3,970,611; U.S. Pat. No. 4,129,701; U.S. Pat. No. 4,101,289; U.S. Pat. No. 4,130,699; U.S. Pat. No. 4,287,327; U.S. Pat. No. 4,535,134; U.S. Pat. No. 4,640,963; U.S. Pat. No. 4,921,919, U.S. Pat. No. 6,069,212, U.S. Pat. No. 6,350,054; and U.S. Pat. No. 6,590,131. It is preferred that the reactor system used to make the compositions of the present invention functions as a plug-flow reactor.

The term "plug-flow reactor" refers to reactors for conducting a continuous fluid flow process without forced mixing at a flow rate such that mixing occurs substantially only transverse to the flow stream. Agitation of the process stream may be desirable, particularly where particulate components are present; if done, agitation will be carried out in a manner such that there is substantially no back-mixing. Perfect plug flow cannot be achieved because the diffusion will always lead to some mixing, the process flow regime being turbulent, not laminar. Since perfect plug flow conditions are not achieved in practice, a plug flow reactor system sometimes is described as operating under substantially plug flow conditions. Depending on manufacturing process conditions, various physical properties of olefin polymers may be controlled. Typical conditions which may be varied include temperature, pressure, residence time, catalyst component concentrations, molecular weight control modifier (such as hydrogen) concentrations, and the like.

The catalyst system used in the process of the invention is preferably a Ziegler-Natta catalyst system. Typical Ziegler-Natta catalyst systems contain a transition-metal (typically IUPAC a Group 4-6 metal) component, preferably a titanium-containing component, together with an organometallic compound such as an aluminum alkyl species. A typical and preferable titanium-containing component is a titanium halide compound, based on titanium tetrahalide or titanium trihalide, which may be supported or combined with other material. These systems are now well-known in the art. The solid transition metal component typically also contains an electron donor compound to promote stereospecificity. The supported titanium-containing olefin polymerisation catalyst component is usually formed by reacting a titanium (IV) halide, an organic electron donor compound and a magnesium-containing compound. Optionally, such supported titanium-containing reaction product may be further treated or modified by further chemical treatment with additional electron donor or Lewis acid species.

Suitable magnesium-containing compounds include magnesium halides; the reaction product of a magnesium halide such as magnesium chloride or magnesium bromide with an organic compound, such as an alcohol or an organic acid ester, or with an organometallic compound of metals of Groups 1, 2, or 13; magnesium alcoholates; or magnesium alkyls.

Suitable solid supported titanium catalyst systems are described in U.S. Pat. No. 4,866,022, U.S. Pat. No. 4,988,656, U.S. Pat. No. 5,013,702, U.S. Pat. No. 4,990,479 and U.S. Pat. No. 5,159,021.

In a typical supported catalyst useful for preparing the propylene copolymers of the present invention, the magnesium to titanium molar ratio may range from 1:1 to 30:1, more preferably from 10:1 to 20:1. The internal electron donor components are typically incorporated into the solid, supported catalyst component in a total amount ranging up to about 1 mole per mole of titanium in the titanium compound. Typical amounts of internal donor are from 0.01 to 1 moles per mole of titanium.

The solid titanium-containing component preferably 1-6 wt % titanium, 10-25 wt % magnesium, and 45-65 wt % halogen. Typical solid catalyst components contain 1-3.5 wt % titanium, 15-21 wt % magnesium and from 55-65 wt % chlorine.

Preferred internal electron donor compounds include esters of aromatic acids. Electron donors of mono- and dicarboxylic acids and halogen, hydroxyl, oxo-, alkyl-, alkoxy-, aryl-, and aryloxy-substituted aromatic mono- and dicarboxylic acids are preferred. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl p-toluate. An especially preferred aromatic ester is a dialkylphthalate ester in which the alkyl group contains from about two to about ten carbon atoms. Examples of preferred phthalate ester are diisobutylphthalate, diethylphthalate, ethylbutylphthalate and d-n-butylphthalate. Other useful internal donors are substituted diether compounds, esters of substituted succinic acid, substituted glutaric acid, substituted malonic acid, and substituted fumaric or maleic acids.

The co-catalyst component preferably is an organoaluminum compound that is halogen free. Suitable halogen-free organoaluminum compounds include, for example, alkylaluminum compounds of the formula $AlR_3$, where R denotes an alkyl radical having 1 to 10 carbon atoms, such as, for example, trimethylaluminum (TMA), triethylaluminum (TEA) and triisobutylaluminum (TIBA).

Organic electron donors useful as external modifiers for the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, mineral acids, organometallic chalcogenide derivatives of hydrogen sulphide, various phosphorus acid esters and amides, and the like. Mixtures of organic electron donors also may be used.

Particularly preferred external electron donor materials include organic silicon compounds, such as silanes having the formula $Si(OR)_nR'_{4-n}$, where R and R' are selected independently from $C_1$-$C_{10}$ (alkyl and cycloalkyl groups and n=1-4. Preferably, the R and R' groups are selected independently from $C_2$ to $C_6$ alkyl, cycloalkyl and heteroalkyl groups such as ethyl, isobutyl, isopropyl, cyclopentyl, cyclohexyl, dialkylamino and the like. Examples of suitable silanes include tetraethoxysilane (TEOS), dicyclopentyldimethoxysilane (DCPDMS), diisopropyldimethoxysilane (DIPDMS), diisobutyldimethoxysilane (DIBDMS), isobutylisopropyldimethoxysilane (IBIPDMS), isobutylmethyldimethoxysilane (IBMDMS), cyclohexylmethyldimethoxysilane (CHMDMS), di-tert-butyldimethoxysilane (DTBDMS), n-propyltriethoxysilane (NPTEOS), isopropyltriethoxysilane (IPTEOS), octyltriethoxysilane (OTEOS), diethylaminotriethoxysilane (DEATEOS) and the like. The use of organic silicon compounds as external electron donors is described, for example, in U.S. Pat. No. 4,218,339; U.S. Pat. No. 4,395,360; U.S. Pat. No. 4,328,122; and U.S. Pat. No. 4,473,660.

The stereoregulating capability and hydrogen response of a given external donor are typically inversely related. For example, the DIPDMS donor has a substantially lower hydrogen response than the TEOS donor, but produces a significantly higher level of stereoregularity than TEOS. Because DIPDMS is more stereoregulating, at an equal reactor hydrogen pressure DIPDMS will provide polymer with a higher level of crystallinity and higher molecular weight, and therefore lower MFR, than will the lesser stereoregulating TEOS donor. Typically, alkyl trialkoxy silanes and especially alkyl triethoxy silanes demonstrate a higher level of hydrogen response and lower stereoregulating capability. Similarly dialkyl or dicycloalkyl dimethoxysilanes, such as DIBDMS, DCPDMS, and DIPDMS, are more stereodirecting. Further, a branched alkyl silane typically produces a more stereodirecting effect than an unbranched alkyl silane.

Particularly preferred are silanes having the formula $Si(OR)_3R'$ or $Si(OR)_4$, where R and R' are selected independently from $C_1$-$C_{10}$ alkyl, cylcoalkyl and heteroalkyl groups. A preferable R group for the silane is ethyl. Mixtures of silanes may also be used.

A typical catalyst system for the polymerization or copolymerization of alpha olefins is formed by combining a supported magnesium- or titanium-containing catalyst or catalyst component and an alkyl aluminum compound as a co-catalyst, together with at least one external modifier which typically is an electron donor and, preferably, is a silane. Thus for the process of the present invention, a particularly preferred catalyst system comprises a Ziegler-Natta catalyst, an alkyl aluminium compound as cocatalyst, and a silane as external modifier. It is preferred that the solid magnesium- or titanium-containing component is added to the first reactor of a multi-reactor system in conjunction with, but separately from, the aluminum alkyl co-catalyst component and additional modifier components. Separation of the catalyst and co-catalyst components is desirable to avoid polymerisation if monomer is present in the catalyst feed lines. Typically, catalyst components are injected into a polymerisation gas-phase reactor in liquid monomer.

Details of preferred catalysts can also be found in U.S. Pat. No. 4,988,656.

The compositions of the present invention are suitable for making injection-moulded articles, which may be used as containers eg for food and drink, or caps and closures, extrusion lamination items and melt spun fibres.

The injection-moulded items can be prepared by well-known processes. The extrusion laminated layers and melt spun fibres typically have thicknesses or diameters in the case of fibres ranging from 10 to 25 μm.

The melt spun fibres can be mono- or multi component, eg bicomponent fibres. In multicomponent fibres, the composition of the present invention can lower the bonding temperature of the fibre or increase its softness.

EXAMPLES

Compositions according to the invention were made in a two reactor continuous polymerisation reactor system. Each of the two reactors was a horizontal, cylindrical reactor measuring 2.7 m in diameter and 16 m in length containing a horizontal stirrer. An inter-stage gas exchange system was located between the two reactors which were capable of capturing first reactor polymerisation product, being vented to remove first reactor gas, and then refilled with fresh gas. This gas exchange system was present in order to preserve different gas compositions in each reactor stage. Both reactors were equipped with an off-gas port for recycling reactor gas through a condenser and back through a recycle line to nozzles in the reactor and liquid propylene was used as a quench liquid to help control the temperature of the polymerization reaction.

Polymerisation was initiated by the introduction to the first reactor of a high activity supported titanium containing catalyst component produced according to Example 1 of U.S. Pat. No. 4,988,656 through a liquid propylene-flushed catalyst addition nozzle. Organosilane modifier and a solution of trialkylaluminum co-catalyst-(TEA) were fed separately to the first reactor through different liquid propylene-flushed addition nozzles. During polymerisation, active polymer powder was captured from the first reactor and exposed to a series of gas venting and re-pressurization steps, before being added to the second reactor. Hydrogen was fed to each reactor in order to achieve the desired powder melt flow rate (MFR). Ethylene and propylene were fed separately in order to maintain the desired ratio of the two gases.

Comparative Example 1 was then peroxidically degraded using 3,6,9-triethyl-3,6,9,-trimethyl-1,4,7-triperoxonane, commercially known as Trigonox 301.

TABLE 1

| EXAMPLE | | 1 | 2 | Comp 1 |
|---|---|---|---|---|
| TEA/Donor | g/g | 2.1 | 2.1 | 2.1 |
| TEA/Catalyst | g/g | 2.1 | 2.1 | 2.1 |
| Component A | | | | |
| Temperature | °C. | 66 | 66 | 66 |
| Pressure | MPa | 2.3 | 2.3 | 2.3 |
| H2/(C2 + C3) | mol/mol | 0.0620 | 0.0680 | 0.0380 |
| C2/C3 | mol/mol | 0.0060 | 0.0060 | 0.0600 |
| MFR | g/10 min | 109.0 | 122.0 | 44.0 |
| C2(A) | wt % | 1.5 | 1.50 | 1.60 |
| Component B | | | | |
| Temperature | °C. | 66 | 66 | 66 |
| Pressure | MPa | 2.2 | 2.2 | 2.2 |
| H2/(C2 + C3) | mol/mol | 0.0348 | 0.0385 | 0.024 |
| Split | wt % | 26.6 | 25.6 | 28.2 |
| C2(B) | wt % | 10.5 | 9.9 | 10.1 |
| C2/C3 | mol/mol | 0.0296 | 0.0284 | 0.0308 |
| Final composition (ex-reactor) | | | | |
| MFR | g/10 min | 88.0 | 99.8 | 42.0 |
| C2(tot) | wt % | 3.90 | 3.65 | 4.00 |
| η (Whole) | dg/l | 0.89 | 0.85 | 1.14 |
| $\eta_A$ | dg/l | 0.82 | 0.78 | 1.13 |
| $\eta_A/\eta_B$ | | 0.75 | 0.74 | 0.96 |
| Formulation | | | | |
| Irganox 1010 | wt % | 0.04 | 0.04 | 0.04 |
| Irganox 168 | wt % | 0.08 | 0.08 | 0.08 |
| Calcium stearate | wt % | 0.05 | 0.05 | 0.05 |
| Millad NX8000 | wt % | 0.2 | 0.2 | 0.2 |
| GMS90 | wt % | 1.2 | 1.2 | 1.2 |
| Trigonox 301 | wt % | — | — | 0.02 |
| Properties (after pelletisation) | | | | |
| MFR | g/10 min | 81.5 | 98.4 | 80 |
| Flex Mod 23° C. | MPa | 1195 | 1250 | 1066 |
| Charpy 23° C. | kJ/m² | 5.4 | 4.7 | 4.6 |
| Izod 23° C. | kJ/m² | 5.0 | 4.7 | 4.5 |
| Izod 0° C. | kJ/m² | 3.7 | 3.6 | 3.4 |
| Haze 2 mm | % | 26.2 | 27.1 | 26.5 |
| Hexane extractables (50° C.) | wt % | 3.1 | 2.9 | 3.0 |
| Crystallisation Temp 20° C./min | °C. | 126.1 | 125.5 | 125.9 |

For the compositions of the invention, significant properties are rigidity, impact resistance, optical properties (haze) and organoleptic properties (hexane extractables). The above Examples show that the compositions of the invention have a good balance of all these properties. For example, the balance of rigidity and impact resistance is improved. For a comparable or even higher value of Charpy/Izod impact resistance, flexural modulus is more than 10% higher in the Examples of the invention than in the Comparative Example. Since the ethylene content of Example 1 is only 0.1 wt % lower than that of the Comparative Example, this improvement is clearly not due to that, and is in fact a direct result of the absence of any degradation process.

The invention claimed is:

1. Propylene random copolymer composition comprising
(A) 60-85 wt % of a copolymer of propylene and from 0.1 to 2 wt % of units derived from ethylene and having a melt flow rate value according to ISO 1133 (230° C., 2.16 kg) of from 60 to 200 g/10 min; and
(B) 15-40 wt % of a copolymer of propylene and from 7 to 17 wt % of units derived from ethylene,
said composition having a total ethylene content of from 3 to 4.5 wt %, and a melt flow rate value according to ISO 1133 (230° C., 2.16 kg) of greater than 60 to 150 g/10 min, the composition having not been subject to any form of post-reactor treatment which increases its melt flow rate by more than 5 g/10 min.

2. Composition according to claim 1, which has a melt flow rate value of 70 to 130 g/10 min.

3. Composition according to claim 1, which is in the form of a powder.

4. Composition according to claim 1, wherein fraction (A) is present in an amount of 65-83 wt %.

5. Composition according to claim 1, wherein fraction (B) is present in an amount of 17-35 wt %.

6. Composition according to claim 1, wherein the content of units derived from ethylene in fraction (A) is 0.3-1.7 wt %.

7. Composition according to claim 1, wherein the content of units derived from ethylene in fraction (B) is 9-16 wt %.

8. Composition according to claim 1, wherein fraction (A) has an intrinsic viscosity η(A) of 0.6-1.0 dg/l.

9. Composition according to claim 1, wherein the intrinsic viscosity η of the composition is 0.7-1.0 dg/l.

10. Composition according to claim 1, wherein the intrinsic viscosity ratio of fractions (A) and (B), η(A)/η(B), is 0.6-1.25.

11. Composition according to claim 1, wherein the moiety of hexane extractables, determined according to FDA method 177, section 1520, Annex B) on polymer formed into 100 μm thick films, is lower than 5.5 wt %.

12. Injection moulded article made from a composition as defined in claim 1.

13. Process for producing a propylene random copolymer according to claim 1, comprising the steps of:
(i) performing a copolymerisation of propylene and ethylene in a first stage to produce a first propylene random copolymer, and
(ii) transferring the first random copolymer to a second stage, optionally in a different reactor from the first stage, where copolymerisation is continued to prepare a second propylene random copolymer,
wherein the final polymer exiting the second stage has an MFR of 60-150 g/10 min prior to any subsequent processing.

14. Process according to claim 13, wherein the copolymerisation is performed in the presence of a catalyst system comprising a Ziegler-Natta catalyst, an alkyl aluminium compound as cocatalyst, and a silane as external modifier.

15. Process according to claim 14, wherein the silane has the formula $Si(OR)_3R'$ or $Si(OR)_4$, where R and R' are selected independently from $C_1$-$C_{10}$ alkyl and cycloalkyl groups.

16. Composition according to claim 4, wherein fraction (A) is present in an amount of 68-82 wt %.

17. Composition according to claim 5, wherein fraction (B) is present in an amount of 18-32 wt %.

18. Composition according to claim 6, wherein the content of units derived from ethylene in fraction (A) is 1.0-1.7 wt %.

19. Composition according to claim 7, wherein the content of units derived from ethylene in fraction (B) is 9-13 wt %.

20. Composition according to claim 8, wherein fraction (A) has an intrinsic viscosity η(A) of 0.7-0.95 dg/l.

21. Composition according to claim 8, wherein fraction (A) has an intrinsic viscosity η(A) of 0.75-0.9 dg/l.

22. Composition according to claim 9, wherein the intrinsic viscosity $\eta$ of the composition is 0.75-0.95 dg/l.

23. Composition according to claim 9, wherein the intrinsic viscosity $\eta$ of the composition is 0.8-0.9 dg/l.

24. Composition according to claim 10, wherein the intrinsic viscosity ratio of fractions (A) and (B), $\eta(A)/\eta(B)$, is 0.65-1.1.

25. Composition according to claim 10, wherein the intrinsic viscosity ratio of fractions (A) and (B), $\eta(A)/\eta(B)$, is 0.7-0.9.

* * * * *